United States Patent [19]

Primke et al.

[11] Patent Number: 4,468,008
[45] Date of Patent: Aug. 28, 1984

[54] FEEDER APPARATUS FOR MELTING FURNACES, PARTICULARLY FOR PLASMA MELTING FURNACES

[75] Inventors: Konrad Primke, Mölkau; Peter Papsdorf, Leipzig; Günther Pohle, Rackwitz; Klaus-Peter Trautmann, Leipzig, all of German Democratic Rep.

[73] Assignee: VEB Mansfeld Kombinat Wilhelm Pieck, Eisleben, German Democratic Rep.

[21] Appl. No.: 503,480

[22] Filed: Jul. 13, 1983

[30] Foreign Application Priority Data

Apr. 6, 1982 [DD] German Democratic Rep. ... 238778

[51] Int. Cl.³ ............................................. C21C 5/42
[52] U.S. Cl. ..................................... 266/99; 266/200; 266/901
[58] Field of Search ................. 266/99, 122, 901, 175, 266/200, 177, 216, 206; 373/18, 21, 63, 79, 81, 115, 142

[56] References Cited

U.S. PATENT DOCUMENTS 3,234,010 2/1966 Mahoney ............................ 266/200
3,682,459 8/1972 Pohlman et al. ..................... 266/99

FOREIGN PATENT DOCUMENTS 0491007 4/1974 U.S.S.R. ............................. 266/901

Primary Examiner—L. Dewayne Rutledge
Assistant Examiner—S. Kastler
Attorney, Agent, or Firm—Gabriel P. Katona

[57] ABSTRACT

The invention comprises a charging apparatus for melting furnaces, especially for plasma melting furnaces, for the continuous melting of preferably prepared aluminum scrap material.

With the help of the proposed solution a controlled and regulated supply of the scrap material along with the prevention of a direct application of the plasma arc or other energy sources directly to the material to be melted, can be accomplished with the simultaneous pre-warming and cleaning of the material to be melted, wherein the metal loss resulting from burning is minimized, the contents of the contaminants within the metallic smelt is reduced and, in addition, an effective environmental protection can be accomplished. This is attained by the provision of an axially movable shaft 4 arranged vertically or tilted in the opening 1 of the furnace and having on the charging side a charging funnel 6 with an exhaust ring nozzle 7. The shaft 4 is guided in a guiding bushing 8 provided with sliding strips, which is welded to the outer wall of the furnace. For the supply of the combustion air as well as for the production of the axial oscillations, the upper portion of the shaft 4 and below the charging funnel 6, a compressed air piping 10 and a mechanical shaker 14 is arranged. The regulation of the charging height is performed by means of a mechanical sensor or a mirror system which is arranged in the shaft 4 or outer of the charging apparatus.

FIG. 1 serves for the best illustration of the invention.

7 Claims, 1 Drawing Figure

FEEDER APPARATUS FOR MELTING FURNACES, PARTICULARLY FOR PLASMA MELTING FURNACES

FIELD AND BACKGROUND OF THE INVENTION

The invention relates to a feeding apparatus for melting furnaces for the continuous melting of scrap, preferably for the melting of prepared light metal scrap material.

Feeding arrangements for melting furnaces, especially for pit, cupola, or blast furnaces became known in a number of constructional variations.

For example a pit furnace used in the melting of aluminum scrap became known (aluminum handbook). The feeding of the scrap is performed here through a bricked-up pit, which serves at the same as the melting space and comprises as a lower limit a tilted melting bridge. The pit furnace has in series connected therewith one or two collecting troughs. The collecting troughs will become heated by special burners, the waste gas of which will flow into the pit furnace.

The disadvantages of such known construction reside in that the chute cone for the scrap material cannot be regulated, and that the light scrap, such as sheet metal and especially lacquered and oiled, contaminated scrap material will become oxidized, as a result of the direct application of the burning flame, and the organic adhesions will become decomposed through the high temperatures of the flame and will split-off oxygen. As a result, a high metal loss takes place. In connection with light material scrap there will be a completely unmeltable slick mountain present, the removal of which will present difficulties.

A method became known furthermore for the melting of light metal chips and especially thin waste material (German Pat. No. 820,968). The chips are dried and pre-formed in a revolving tubular furnace heated by the waste gases of an open hearth furnace and are fed thereafter through a shaft into the metal smelting area of an open hearth furnace. The feeding of the raw material is performed outside of the furnace area and insulated from the flame gases. The waste gases are used for the pre-warming and the drying of the material to be melted in a separate rotating tubular furnace or kiln. This means that in addition to the melting furnace an additional rotating kiln is necessary, coupled with an increased space requirement and requires also a larger mechanical layout for the operation.

Furthermore, there is also known a device for the feeding of the filling material and the removal of the reaction gases from a closed electrical melting furnace (DE-OS 2,830,720). It is characterized in that a pipe conduit system serves for the supplying of the filling material from a main pipe and which leads directly into the trough of the furnace through the center part of the arched roof thereof, and is determined by the mass of the material to be fed and it is disposed in equal distances from the associated electrodes and comprises also auxiliary piping, which are arranged near each electrode diametrically with respect to the central pipe and with respect to the axis of such electrode.

Inasmuch as in this solution the chute cone is placed onto the melting bath and, thereby, the material comes in direct contact with the arc, the use of such supply arrangement within a plasma furnace would lead to a disadvantage in that a high oxidation of the material to be melted would take place through the direct application of the plasma arc to it.

Furthermore, such supply arrangement will require a very high structural layout.

SUMMARY OF THE INVENTION

The object of the invention is to provide a feeding apparatus for a melting furnace, especially for a plasma melting furnace, which is capable of providing an improvement of the material economy by the presence of slight material losses resulting from the burning off, along with an effective environmental protection, as well as it would contribute to an improved economic use of the secondary raw materials.

The technical object which is to be solved by the invention resides in the provision of a supply arrangement for melting furnaces, especially for plasma melting furnaces, which enables a controlled and regulated feed of the scrap material, preventing a direct application of the plasma arc and other energy sources, such as flames and electric arcs to the material to be melted, and, at the same time providing a pre-warming and cleaning of the material to be melted while minimizing the burning off losses and a destruction of the supply arrangement through flaking or melting off.

The object is solved by a cylindrical shaft made from a scale-proof material arranged vertically or tilted in an opening of the furnace brick work leading to the furnace space and axially movable by means of a known lifting device and, which in order to separate the supply of the scrap material from the direct atmosphere of the furnace and, in order to prevent the direct application of the plasma arc or other energy sources to the scrap material, will reach in its lower position up to the upper surface of the melting bath and on its charging or filling side it is limited by means of a charging funnel including an exhaust ring nozzle. The shaft of the supply arrangement is guided in a guiding bushing which is welded to the outer wall of the furnace. Within the guiding bushing there is provided, by means of bolted thereto, sliding strip means made from a heat resistant material, for example, from asbestos.

In the upper portion of the shaft, but below the charging funnel, there are provided one or a plurality of compressed air piping means for supplying the burning or combustion air and which terminate at least at a height of 150 mm above the upper surface of the melting bath, wherein the lower portion of the compressed air piping means is provided with a plurality of bores for a uniform distribution of the combustion air. The shaft is provided in its lower portion, which projects into the furnace area, with an aluminum oxide layer or other sprayed thereon ceramic protective coating for protection against the plasma arc and, comprises for the regulation of the scrap material height a control system in the form of a mirror system, or a mechanical sensor carried by the charging funnel.

In order to provide a uniform charging of the material to be melted within the shaft, there is provided a mechanical rattler on the shaft, and wherein the rattler or shaker will set the shaft into axial oscillations having a small amplitude.

BRIEF DESCRIPTION OF THE DRAWING

The invention will be explained in connection with an embodiment.

DESCRIPTION OF THE PREFERRED EMBODIMENT

Figure 1:
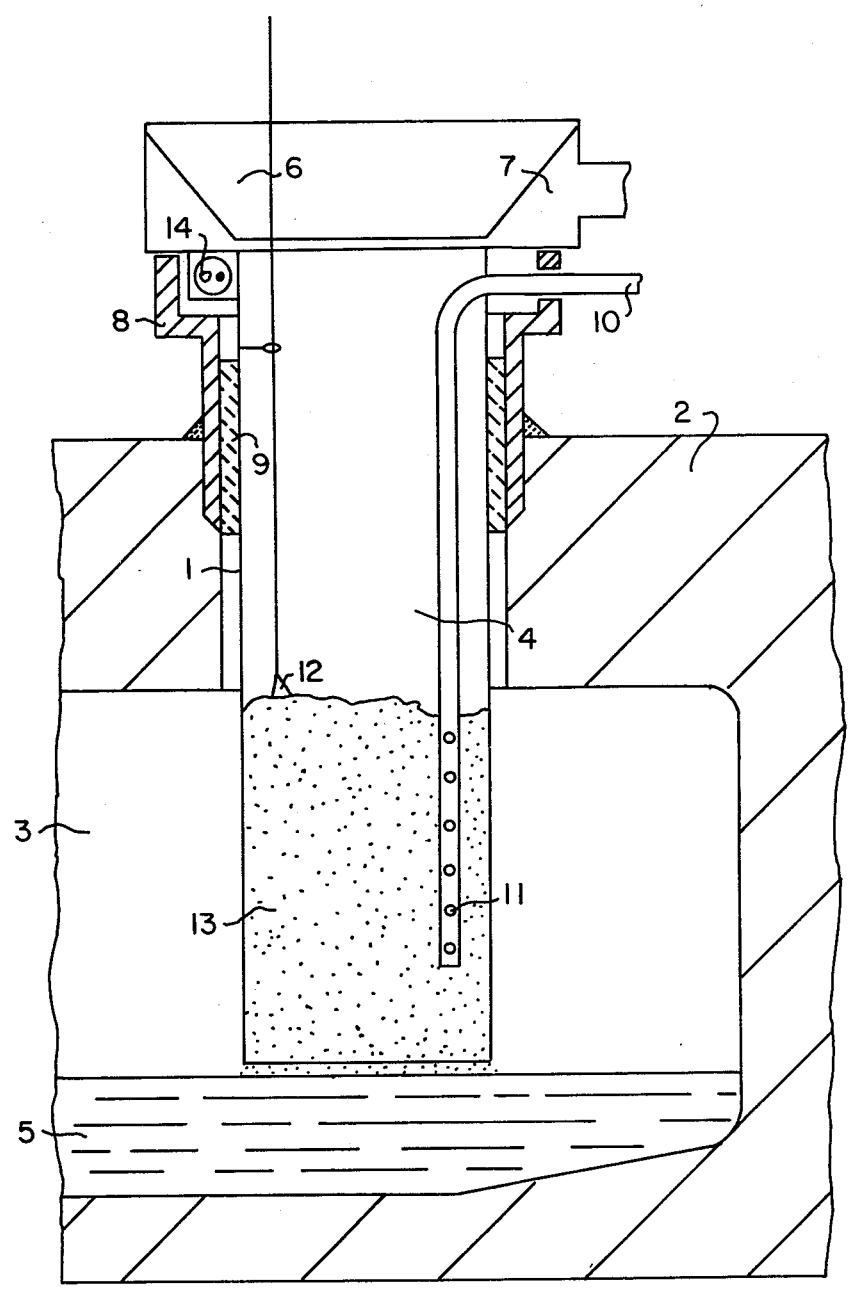
FIG. 1 illustrates a sectional view taken through a supply arrangement.

As can be seen from FIG. 1, the supply arrangement comprises an cylindrical shaft 4 which is axially moveable by means of a lifting arrangement and which reaches up to the upper surface of the melting bath 5 and having on the charging side a charging funnel 6 which comprises an exhaust ring nozzle 7. The shaft 4 of the supply arrangement is guided in a guiding bushing 8 which is welded to the outer wall of the furnace and, on the inner side, it is provided with sliding strips 9 made from a heat resistant material. The mounting of the supply arrangement is performed through an opening 1 made in the furnace brick work 2 and leading into the furnace space 3 and arranged vertically or in a tilted fashion. Below the charging funnel 6 and on the upper portion of the shaft 4, there are provided for the supplying of the air for an improved burning of the adhesive organic substances, one or more compressed air pipings 10, which terminate at least at the height of 150 mm above the upper surface of the melting bath 5. The lower portion of the compressed air piping 10 is provided with a plurality of bores 11 for a uniform distribution of the combustion air.

In addition, on the upper portion of the shaft 4, a mechanical rattler or shaker 14 is provided which will set it into axial oscillations having a small amplitude and, thereby assures a uniform afterfeed of the material to be melted 13.

For the regulation of the height of the scrap material, a control system 12 is provided in the form of a mirror system or of a mechanical sensor carried by the charging funnel 6. The melting material 13 which is supplied through the charging funnel 6 becomes dried and prewarmed by means of the furnace waste gases which flow therethrough and will sink through its own weight into the metling bath 5 and becomes melted. The adhesive organic contaminations will become combusted through the temperatures which will develop in the shaft which partially occurs through the supply of the combustion air, and become burned off. The exhaust gases which are formed as a result of the latter, are exhausted through the exhaust ring nozzle 7 provided in the charging funnel 6.

The invention distinguishes itself when compared with the available and known prior art, by a variety of advantages. The main advantage resides in that the oxidation of the material to be melted will be reliably minimized by protection from the direct influence of the plasma arc or other energy sources, whereby losses due to burning off are reduced. By drying and prewarming of the material to be melted within the shaft by means of the hot furnace gases and by the burning off of the adhesions, an energy saving is attained during the meltint process. Furthermore, a cleaning of the melting material occurs before the melting itself inasmuch as the mixed organic contamination will be burned off in the shaft. As a result, in addition to the reduction of the oxidation within the furnace area, the content of the contaminants in the metallic smelt will be reduced. A further important advantage resides also in the possibility of exactly regulating the height of the scrap material within the shaft and thereby of the regulation of the melting speed itself.

We claim:

1. Charging apparatus for melting furnaces, especially plasma arc furnaces, for the continuous melting of preferably prepared light metal scrap material, comprising a shaft (4) arranged in an opening (1) of the brick works (2) of the furnace and movable axially and having a lower end extending up to the upper surface of the melting bath (5), a filling funnel (6) arranged on the charging side of the shaft and including an exhaust ring nozzle (7), wherein the shaft (4) is guided in a guiding bushing (8) welded to the outer wall of the furnace and provided with sliding strips (9), compressed air pipings (10) for the supply of combustion air through the upper portion of the shaft (4) and provided directly below the charging funnel (6) and, a mechanical shaker (14) arranged above the shaft (4) for the provision of axial oscillations.

2. The apparatus according to claim 1, wherein the shaft (4) may be arranged vertically or tilted with respect to the furnace.

3. The apparatus according to claim 1, wherein the axial movement of the supply arrangement is performed by means of a known lifting device.

4. The apparatus according to claim 1, wherein the shaft (4) comprises tinder or scale proof material and, on its lower end projecting into the furnace space, is coated with an aluminum oxide layer or with other sprayed-on ceramic protecting layer.

5. The apparatus according to claim 1, wherein the compressed air piping (10) terminates at a height of at least 150 mm above the upper surface of the melting bath (5) and is provided with bores (11) in the lower part for distribution of the combustion air.

6. The apparatus according to claim 1, wherein for the regulation of the height of the material to be melted (13) within the charging cone within the shaft or outside of it, there is provided a mechanical control system (12).

7. The apparatus according to claim 6, wherein the mechanical control system (12) comprises a mirror system arranged above the charging apparatus or a mechanical sensor carried by the charging funnel.

* * * * *